US011748138B2

(12) United States Patent
Babu

(10) Patent No.: US 11,748,138 B2
(45) Date of Patent: Sep. 5, 2023

(54) SYSTEMS AND METHODS FOR COMPUTING A SUCCESS PROBABILITY OF A SESSION LAUNCH USING STOCHASTIC AUTOMATA

(71) Applicant: Citrix Systems, Inc., Fort Lauderdale, FL (US)

(72) Inventor: Sharath Babu, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 509 days.

(21) Appl. No.: 16/984,422

(22) Filed: Aug. 4, 2020

(65) Prior Publication Data
US 2021/0397469 A1    Dec. 23, 2021

(30) Foreign Application Priority Data
Jun. 23, 2020    (IN) .................. IN202021026460

(51) Int. Cl.
G06F 9/455    (2018.01)
G06F 11/34    (2006.01)
G06N 7/01    (2023.01)

(52) U.S. Cl.
CPC ...... *G06F 9/45558* (2013.01); *G06F 11/3419* (2013.01); *G06N 7/01* (2023.01); *G06F 2009/45579* (2013.01); *G06F 2201/81* (2013.01)

(58) Field of Classification Search
CPC ............. G06F 9/45558; G06F 11/3419; G06F 2009/45579; G06F 2201/81; G06N 7/01
See application file for complete search history.

(56) References Cited

U.S. PATENT DOCUMENTS

| | | | |
|---|---|---|---|
| 2011/0131571 A1* | 6/2011 | Heim | G06F 9/45558 718/1 |
| 2015/0039764 A1* | 2/2015 | Beloglazov | H04L 67/52 709/226 |
| 2020/0027553 A1* | 1/2020 | Vaughn | G16H 10/60 |

OTHER PUBLICATIONS

Kapgate, D.: Weighted moving average forecast model based prediction service broker algorithm for cloud computing. Int. J. Comput. Sci. Mob. Comput. 3(2), 71-79. (Year: 2014).*

* cited by examiner

*Primary Examiner* — Jacob D Dascomb

(57) ABSTRACT

Described embodiments provide systems and methods for a management service using virtual delivery agent measurement metrics to determine the probability of the virtual delivery agent successfully launching a connection to a virtual application and desktop service. A probability mass function is implemented to determine the correlation between the measurement metrics over time, and the probability mass function distribution is mapped to a states in a linear Markov chain such that the probability of the virtual delivery agent successfully launching a connection to a virtual application and desktop service is based on the current state of the Markov chain.

15 Claims, 8 Drawing Sheets

SYSTEMS AND METHODS FOR COMPUTING A SUCCESS PROBABILITY OF A SESSION LAUNCH USING STOCHASTIC AUTOMATA

CROSS-REFERENCE TO RELATED APPLICATION

This application claims priority to and the benefit of Indian Provisional Patent Application No. 202021026460, titled "SYSTEMS AND METHODS FOR COMPUTING A SUCCESS PROBABLITY OF A SESSION LAUNCH USING STOCHASTIC AUTOMATA," and filed on Jun. 23, 2020, the contents of all of which are hereby incorporated herein by reference in its entirety for all purposes.

FIELD OF THE DISCLOSURE

The present application generally relates to computing a probability, including but not limited to systems and methods for preemptively mitigating risks associated with failed session launches by computing the probability of a successful session launch using stochastic automata.

BACKGROUND

Several advantages exist when deploying cloud based management service-managed virtual applications and desktop services as compared to traditional customer-managed applications and desktop services. These advantages include ease of deployment, ease of operation, ease of management, scalability, and better workflow. Different entities have different means of connecting users to virtual applications and desktop services.

A virtual delivery agent ("VDA") may allow connections to virtual machines that host virtual applications and desktop services. The VDA may be responsible for brokering connections from the virtual machine to a particular customer. Thus, VDA's may be utilized or responsible for establishing and managing connections to the virtual machine. A connection between a virtual machine and a user may be called a session, flow, or similar terms. During a VDA's connection launch and reconnection, the VDA may apply policies and configure the user machine for a virtual session. In some embodiments, a VDA may be checked such that the health of the VDA, or the quality of the connections, may be known by the user.

While VDAs may be critical in establishing connections such that users can access virtual machines, VDAs may fail at successfully launching a session. In some embodiments, too many users may attempt to access a virtual machine and the virtual machine may get overloaded, causing the VDA to fail. In other embodiments, network latency may cause a VDA to fail. For example, applications may time-out and a VDA may not be able to create a session. In other embodiments, the VDA itself may not operate properly, which may cause the VDA to fail. Aside from a drastically impaired user experience, additional resources may be consumed by attempting to instantiate VDAs that are unable to operate successfully or are unable to access a virtual machine or service successfully, such as wasted bandwidth communicating with an malfunctioning VDA or wasted memory and processor capacity instantiating such processes.

SUMMARY

This Summary is provided to introduce a selection of concepts in a simplified form that are further described below in the Detailed Description. This Summary is not intended to identify key features or essential features, nor is it intended to limit the scope of the claims included herewith.

To address issues with malfunctioning VDAs or VDAs unable to properly perform their functions and provide prediction of potential or likely malfunctions, the systems and methods discussed herein provide for a management service executed by a processor to receive a metric measurements for a VDA. The management service may determine, from the metric measurements, a current state in a Markov chain, where the current state is associated with ratios of the VDA's session launch attempts. Based on the VDA's session launch attempts, a probability of a successful launches of the VDA may be determined. The management service may receive a probability of a successful launch per each VDA, and, based on the probabilities of a VDA's successful launch, select a successful VDA to be directed for client use.

Another aspect provides for a management service in communication with a VDA such that the management service may receive metric measurements from the VDA, determine a current state in a Markov chain, where the current state is associated with ratios of session launch attempts of the VDA, calculate a probability of a successfully launched session based on the ratios of session launch attempts of the VDA, receive a client request to access a CVAD, select a VDA associated with the highest probability of successfully launching a session, and direct a request of the client device to the selected VDA.

In one aspect, this disclosure is directed to a method for each virtual delivery agent of a plurality of virtual delivery agents executed by one or more computing devices: receiving, by a management service executed by a processor, a plurality of metric measurements for the virtual delivery agent, determining, by the management service from the plurality of metric measurements, a current state of a plurality of states of the virtual delivery agent, each state of the plurality of states associated with a ratio of successful accesses of the virtual delivery agent to access attempts of the virtual delivery agent, and calculating, by the management service, a probability of successful access of the virtual delivery agent according to the ratio associated with the current state of the virtual delivery agent; receiving, by the management service, a request of a client device to access a virtual application and desktop; selecting, by the management service, a virtual delivery agent of the plurality of virtual delivery agents associated with a highest probability of successful access; and directing, by the management service, the request of the client device to the selected virtual delivery agent.

In some embodiments, the method of computing a success probability of a session launch further comprises incrementing, by the management service, an access attempt counter associated with the selected virtual delivery agent. The method may further comprise receiving, by the management service from the selected virtual delivery agent or the client device, an identification of successful access of the selected virtual delivery agent; and responsive to receipt of the identification, incrementing a counter of successful accesses of the selected virtual delivery agent. Further, the method of computing a success probability of a session launch further comprises updating the ratio of successful accesses to access attempts associated with the selected virtual delivery agent.

In some embodiments, the plurality of states comprise a linear Markov chain. In some embodiments, the plurality of metric measurements comprise a multi-dimensional measurement vector. In other embodiments, the plurality of metric measurements comprise a round trip time of communications between a client device and the virtual delivery agent.

In certain embodiments, the method of computing a success probability of a session launch further comprises determining, by the management service, that a probability of successful access to a second virtual delivery agent is below a threshold; and generating, by the management service, an alert responsive to the determination that the probability of successful access to the second virtual delivery agent is below the threshold. Further, initiating a reboot of the second virtual delivery agent, by the management service, responsive to the determination that the probability of successful access to the second virtual delivery agent is below the threshold.

In another aspect, this disclosure is directed to a system for a management service executed by a processor in communication with a plurality of virtual delivery agents executed by one or more computing devices; wherein the management service is configured to: for each virtual delivery agent of the plurality of virtual delivery agents: receive a plurality of metric measurements for the virtual delivery agent, determine, from the plurality of metric measurements, a current state of a plurality of states of the virtual delivery agent, each state of the plurality of states associated with a ratio of successful accesses of the virtual delivery agent to access attempts of the virtual delivery agent, and calculate a probability of successful access of the virtual delivery agent according to the ratio associated with the current state of the virtual delivery agent; receive a request of a client device to access a virtual delivery agent; select a virtual delivery agent of the plurality of virtual delivery agents associated with a highest probability of successful access; and direct the request of the client device to the selected virtual delivery agent.

In some embodiments, the management service is further configured to increment an access attempt counter associated with the selected virtual delivery agent. In certain embodiments, the management service is further configured to: receive, from the selected virtual delivery agent or the client device, an identification of successful access of the selected virtual delivery agent; and responsive to receipt of the identification, increment a counter of successful accesses of the selected virtual delivery agent. Further, the management service is further configured to update the ratio of successful accesses to access attempts associated with the selected virtual delivery agent.

In certain embodiments, the plurality of states comprise a linear Markov chain. In some embodiments, the plurality of metric measurements comprise a multi-dimensional measurement vector. In certain embodiments, the plurality of metric measurements comprise a round trip time of communications between a client device and the virtual delivery agent. In some embodiments, the management service is further configured to: determine that a probability of successful access to a second virtual delivery agent is below a threshold; and generate an alert responsive to the determination that the probability of successful access to the second virtual delivery agent is below the threshold. Further, the management service is further configured to initiate a reboot of the second virtual delivery agent, by the management service, responsive to the determination that the probability of successful access to the second virtual delivery agent is below the threshold.

In certain embodiments, a non-transitory computer-readable medium comprising instructions that, when executed by a processor of a device, cause the processor to: for each virtual delivery agent of a plurality of virtual delivery agents executed by one or more computing devices: receive a plurality of metric measurements for the virtual delivery agent, determine, from the plurality of metric measurements, a current state of a plurality of states of the virtual delivery agent, each state of the plurality of states associated with a ratio of successful accesses of the virtual delivery agent to access attempts of the virtual delivery agent, and calculate a probability of successful access of the virtual delivery agent according to the ratio associated with the current state of the virtual delivery agent; receive a request of a client device to access a virtual application and desktop; select a virtual delivery agent of the plurality of virtual delivery agents associated with a highest probability of successful access; and direct the request of the client device to the selected virtual delivery agent. Further, the computer-readable medium, further comprising instructions that, when executed by the processor of the device, cause the processor to: determine that a probability of successful access to a second virtual delivery agent is below a threshold; and generate an alert responsive to the determination that the probability of successful access to the second virtual delivery agent is below the threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

While VDAs are critical in establishing connections such that users can access virtual machines, VDAs may fail at successfully launching a session. In some embodiments, too many users may attempt to access a virtual machine and the virtual machine may get overloaded, causing the VDA to fail. In other embodiments, network latency may cause a VDA to fail. For example, applications may time-out and a VDA may not be able to create a session. In other embodiments, the VDA itself may not operate properly, which may cause the VDA to fail.

When a VDA fails to successfully create a session, the user may contact a network administrator at a management service and explain the details of the session failure. Subsequently, the network administrator may take over the VDA and fix the VDA. Until the network administrator fixes the VDA, the user may be denied access to the virtual machine. A user's inability to access the virtual machine may reduce a user's operational capacity. For example, the user may experience high downtown, reduced productivity, wasting resources. Aside from a drastically impaired user experience, additional resources may be consumed by attempting to instantiate VDAs that are unable to operate successfully or are unable to access a virtual machine or service successfully, such as wasted bandwidth communicating with an malfunctioning VDA or wasted memory and processor capacity instantiating such processes.

In enterprises that do not implement the systems and methods discussed herein, administrators may not have a means of measuring the success probability of a session launch against a particular VDA. Thus, in such implementations, administrators can not proactively identify VDAs that have a low success rate for a session launch. Accordingly, the systems and methods discussed herein provide functionality for computing the probability of a given VDA's successful launch. The VDA's with a low probability of a successful launch may be identified and proactively addressed before the VDA launches a session.

Section A describes a traditional customer-managed virtual deployment and a cloud management-service managed virtual deployment;

Section B describes systems and method for computing a success probability of a session launch using stochastic automata; and Section C describes a computing environment which may be useful for practicing embodiments described herein.

Figure 1A:
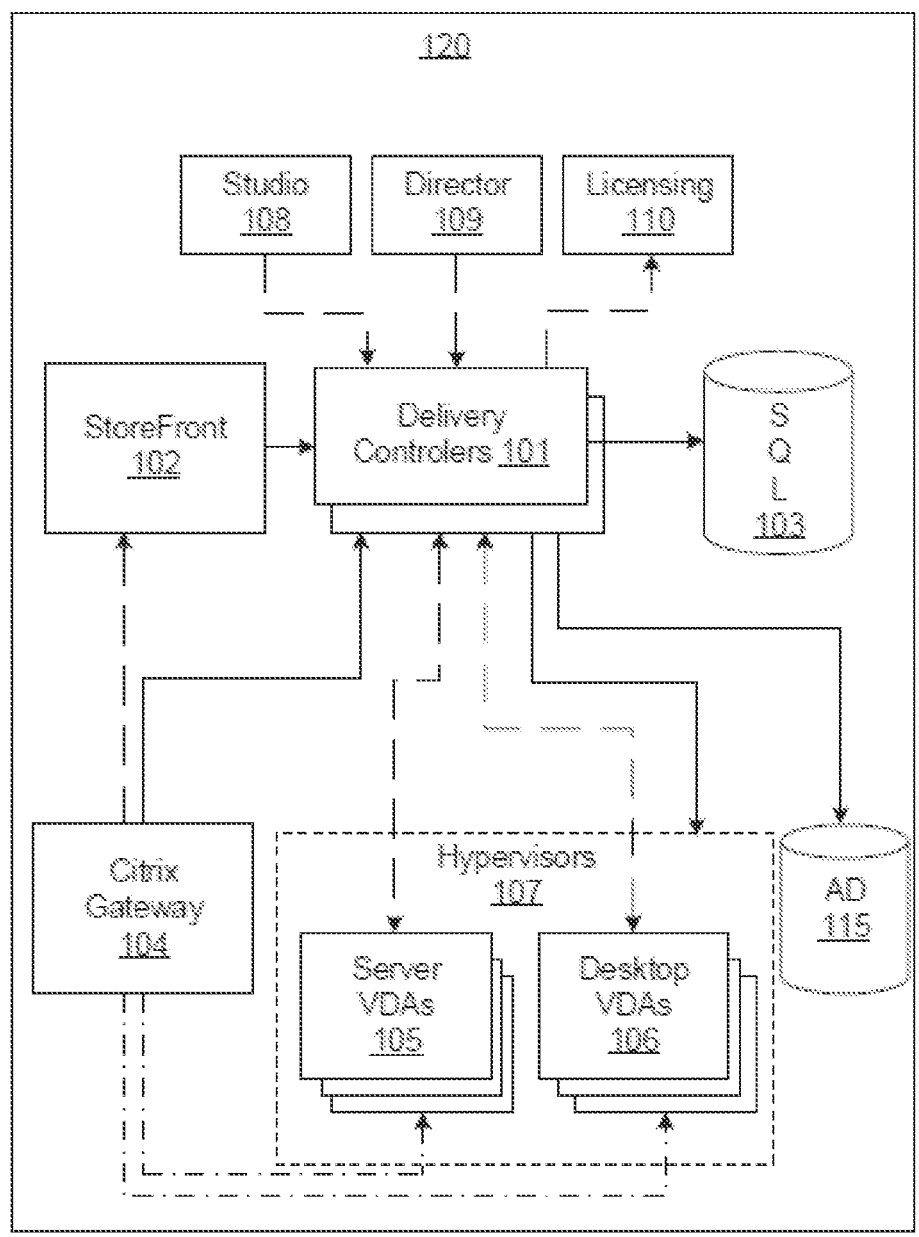
FIG. 1A is a block diagram of an embodiment of a traditional deployment of applications and desktops.

A. Customer-Managed and Management-Service Managed Virtual Machine Deployment Architectures Referring to FIG. 1A, depicted is a block diagram of system 100, a traditional customer-managed deployment of virtual applications and desktops. The components 120 of system 100 may be on the customer's premise or stored on a cloud. Example components include: a delivery controller 101, which is a server side component responsible for managing use access and optimizing connections; storefront 102, which allows users access to authorized applications and desktops; and a structured query language ("SQL") database 103, which is a database that may store current sessions and connection information in addition to configuration changes and administrative activities.

Studio console 108 and director console 109 may also be integrated into system 100 by configuring and monitoring the delivery controllers 101. For example, the director console 109 may allow administrators to control and monitor the virtual desktops and applications, while the studio console 108 may allow users to configure virtual application and desktop policies.

The delivery controllers 101, storefront servers 102, SQL database 103, studio console 108, director console 109, licensing server 110, and gateway 104 are part of the management plane. In some embodiments, the gateway 104 may be a Citrix gateway or other physical computing device, such as a firewall, switch, router, network accelerator, or other such device. The gateway 104 may be an entryway for data entering and leaving external networks. The licensing server 101 may keep track of a user's access to software, for example, libraries or applications.

In this deployment architecture, the management plane is the plane that controls the environment and is deployed at a data center or cloud that is customer or partner-managed. These components direct management traffic 111. Management traffic 111 may be used to receive status information of other components. In other embodiments, the management traffic 111 may utilize the Flexcast Management Architecture ("FMA") protocol provided by Citrix Systems, Inc., to allow applications to communicate with one another.

The hypervisors 107 may comprise systems for management of virtual infrastructures, including providing applications access to underlying physical computing resources, such as processors, memory, network interfaces, etc. The hypervisors 107 manage the server VDAs 105 and desktop VDAs 106. The server VDAs 105 may connect a user to a server, while the desktop VDAs 106 may connect a user to a virtual desktop.

Flowing from the gateway 104 to the server VDA 105 and desktop VDA 106 is Extensible Markup Language ("XML") traffic 112. In other embodiments, the XML traffic 112 may utilize the Independent Computing Architecture ("ICA") protocol provided by Citrix Systems, Inc., or any other session or presentation layer protocol, such as the Remote Desktop Protocol. Further, application traffic 113 may be traffic that the components use to communicate with one another. For example, the delivery controllers 101 are responsible for communicating with the active directory ("AD") 115. The AD 115 provides the means to manage the identities and relationships of the users in the network. For example, the AD 115 may configure the administration system settings, user settings, and application settings. Thus, application data 113 flows between the delivery controllers 101 and the AD 115.

Figure 1B:
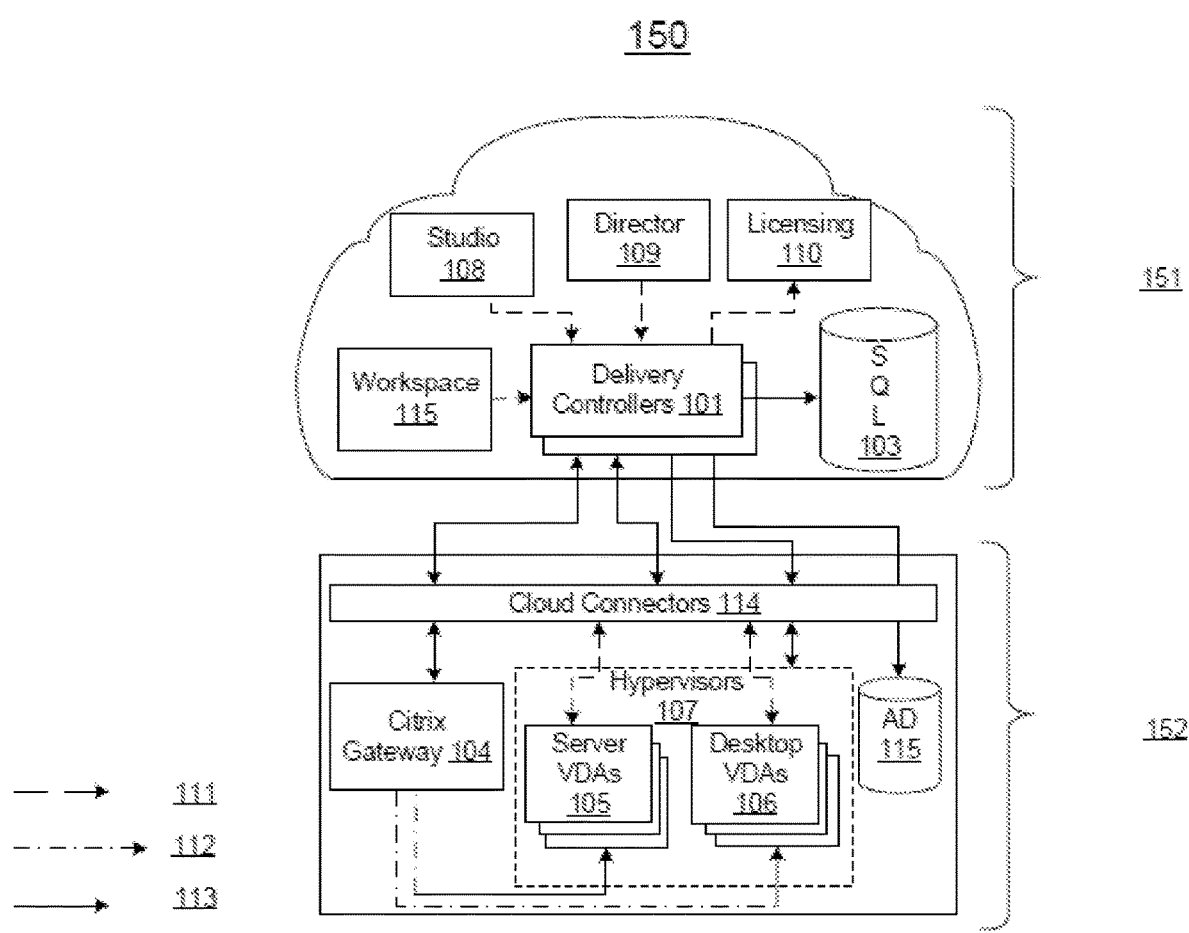
FIG. 1B is a block diagram of an embodiment of a cloud based virtual application and desktop service.

FIG. 1B is similar to FIG. 1A but it describes a cloud management-service managed deployment for applications and desktops. One example of a cloud management-service managed deployment for applications and desktops is the Virtual Application and Desktop Services (CVAD) system manufactured by Citrix Systems, Inc. Referring to FIG. 1B, depicted is a block diagram system 150, a cloud based management-service managed virtual application and desktop service.

The components encompassed in area 151 are the components in the cloud. For example, the components may be stored on a cloud or other network storage and application delivery system. The delivery controllers 101, workspace 115, SQL database 103, studio console 108, director console 109, and licensing server 110, which are part of the management plane, may be similarly stored in a network storage and delivery system or cloud. The workspace 115 may replace the storefront 102 in FIG. 1A, and may be a protocol provided by Citrix Systems, Inc., or any other session or presentation layer protocol. While the storefront 102 may allow users to access authorized applications and desktops, a protocol such as the workspace 115 may allow an administrator to deliver applications and desktops to users. The workspace 115 aggregates applications and data from onpremises and cloud environments to deliver resources to users in need of resources. In this deployment architecture, the management plane is the plane that controls the environment and may be deployed by a management-service to maintain the environment such that a customer may save time and reduce costs. For example, Citrix Systems, Inc. may be a management-service that deploys the management plane. By utilizing a management-service to manage the management plane, customers may not have to handle the installations, upgrades, monitoring and configuration of the management plane. The management-service may maintain the connection between the virtual machines and users, not the client. For example, Citrix Systems, Inc. may be a management-service that maintains the connection between the virtual machines and users.

Several components may remain customer managed. These components are indicated by area 152. The customer may manage these components using a cloud of on the client's premises. The customer managed components include the gateway 104, the cloud connectors 114, the server VDAs 105, the desktop VDAs 106, and the AD 115. One key factor in deploying a management-service managed environment is the connector between the client and management-service. In some embodiments, cloud connectors 114 may be used. Server VDAs 105 and desktop VDAs 106 establish connections with the cloud connectors 114. Server VDAs 105 and desktop VDAs 106 are the closest connectors to the user. Thus, their functioning properly is important for a user to access a virtual machine.

B. Systems and Methods for Computing a Success Probability of a Session Launch

In enterprises that do not implement the systems and methods discussed herein, administrators may not have a means of measuring the success probability of a session launch against a particular VDA. Thus, administrators can not proactively identify VDAs that have a low success rate for a session launch. Accordingly, a system and method for computing the probability of a given VDA's successful launch may be desired. The VDA's with a low probability of a successful launch may be identified and addressed before the VDA launches a session.

The present disclosure is directed towards systems and methods for a management service executed by a processor to receive a metric measurements for a VDA. The management service may determine, from the metric measurements, a current state in a Markov chain, where the current state is associated with ratios of access attempts of the VDA. Based on the ratio of access attempts of the VDA, a probability of a successful launches of the VDA may be determined. The management service may receive a plurality of probabilities of successful launches per each VDA and based on the probabilities of a VDA's successful launch, select a successful VDA to be directed for client use.

Another aspect provides for a management service in communication with VDAs such that the management service may receive metric measurements from the VDAs, determine a current state in a Markov Linear Chain, where the current state is associated with ratios of access attempts of the VDA, calculate a probability of a successful access based on the ratios of access attempts of the VDA, select a VDA associated with the highest probability of successful access and direct a request of the client device to the selected VDA.

Figure 2:
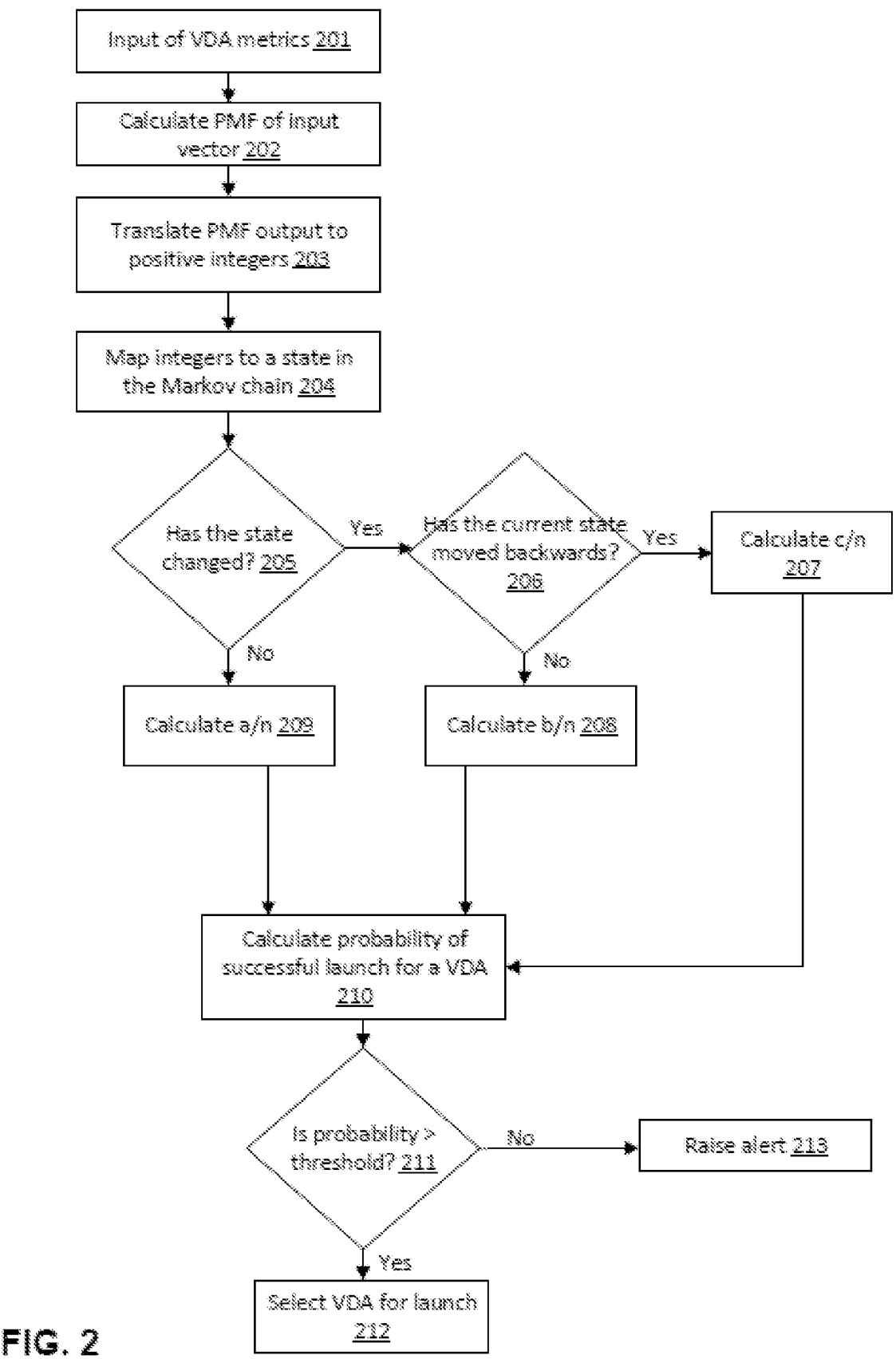
FIG. 2 is a flow chart of an embodiment of a method for computing a success probability of a session launch using stochastic automata.

Referring to FIG. 2, depicted is a flow chart of an embodiment of a method for computing a success probability of a session launch using stochastic automata. The functionalities of the method may be implemented using, or performed by, the components detailed herein in connection with FIGS. 1A, 1B and FIG. 7. In brief overview, measurement metrics of a VDA may be captured as an input vector 201. The PMF of the input vector may be determined 202. The PMF output may be mapped to a state in a Linear Markov Chain 204, and an analysis of the PMF output on the state of the chain may be performed 205. Based on the adjustments to the Linear Markov Chain, ratios related to the access attempts of the VDA may be determined and updated 210. Based on the ratio of access attempts of the VDA, a probability of a successful launch of the VDA may be determined 211. VDAs with high probabilities of a successful launch may be directed to a client 214, while VDAs with a low probability of a successful launch may be flagged 213.

In step 201, VDA metrics are retrieved by a processor operating in a management service environment. The processor may receive a plurality of VDA metrics corresponding to a plurality of VDAs. The metrics may be used to model the VDA. Increasing the number of metrics may improve the accuracy of the probability of that VDA's successful launch.

Computing the probability of a VDA's successful launch may be considered a non-deterministic system. In non-deterministic systems, the output of the system is unknown. The output of the system is determined by analyzing data points and determining a correlation between the data points and system behavior at points in time. Thus, the more data points used to determine the system behavior, the more accurate the output may be. Therefore, the more VDA metrics received by the processor, the more accurate the probability of that VDA's successful launch may be.

Examples of VDA metrics may include: a session count, or the total number of sessions the VDA has attempted to establish; a VDA load, or the demand that the user may be attempting to use the VDA for; User Experience Score, which may be a measurement based on latency, round trip time, loss rates, time to launch the app, and responsiveness; ICA Round Trip Time, or the elapsed time from when a user hits a key until a response is display back at and end point for an ICA remote desktop session, etc. Each VDA metric is treated as a discrete random number and may be arranged as an n-dimensional vector.

In step 202, the Probability Mass Function ("PMF") of the input vector is determined. The PMF outputs a probability that a discrete random variable is equal to some value. In other words, at time t in the system, the probability of the discrete random variable occurring may be determined. When the input vector to the PMF is a vector of random variables, the PMF is treated as a joint probability mass function. The joint PMF is a function that can characterize the distribution of a discrete random vector. In other words, when the input vector is a vector of random variables, the joint probability mass function will output a single value representing the correlation of all of the random variables in the input vector.

The VDA metrics may be considered discrete random variables, because a discrete random variable is a variable whose value may be determined by an underlying event. In other words, the value of the VDA metric may be determined by the success of the VDA launching a session. For example, the User Experience Score may be a very low value if the VDA does not successfully launch a session. Thus, using the PMF function may highlight the effect of the VDA metrics at a certain time t in successfully launching a session. The correlation between the VDA metrics at a point in time can subsequently be determined can be determined for each VDA. In alternate embodiments, any function or mechanism for determining a correlation between the VDA metrics and a point in time may be used.

In step 203, the PMF output may be translated to positive integers. The output of the PMF is a probability of the random variable at a certain point in time. Thus, the probability is a fraction. The probability may be translated into a positive integer by multiplying the PMF value by 100 or other multiple of 10.

In step 204, the positive integer of the PMF is mapped to a state in the stochastic automata by a predictor. A stochastic automata is a state machine with a stochastic transition behavior. In other words, a stochastic automata may indicate a set of states that may exist and the probability of being in that state and the probability of moving between states. A Linear Markov chain is one embodiment of stochastic automata. In a Markov chain, the future state depends on the current state.

The Markov chain may contain any number of states. The more states in the Markov chain, the more granular the determination of the transition probabilities may be. The transition probabilities, or the probability that a state may move forward to a next state, the probability that a state may move backward to a previous state, or the probability that a state stays in the same state, may be calculated by ratios that are sensitive to the total number of states.

In some embodiments, eight states may be used. Each state in the Markov chain may have a predefined range. For example the first state may include integers from 0-12, the second state may include integers from 12-24, etc. Thus, the positive integers representing the correlation of the VDA metrics at a point in time for each VDA are mapped to the states of the Markov chain by a predictor. A predictor predicts the future state of the Markov chain based on the integer mapping of the predefined state ranges.

The decision in step 205 is based on comparing the state of the newly mapped PMF value to the current state of the VDA. The predictor may assess whether a state has moved forward to a next state, whether a state has moved backward to a previous state, or whether the state has stayed the same. The Markov chain may act as memory because the Markov chain keeps track of the current state. Thus, the decision in step 205 evaluates how the state of the newly mapped PMF value compares with the current state of the VDA.

The Markov chain may move more than one state at a time. For example, the current Markov state may be in state 3. If the PMF value of the integer is mapped to state 5, then the Markov state may move forward two states such that the current state of the Markov chain is state 5.

If the state has not changed, then a probability of staying in that state may be evaluated, as is indicated in step 209. The probability of staying in the same state may be calculated by a ratio $$\frac{a}{n},$$

where a is the number of times the state has been mapped to the current state without any transition, and n is the total number of times the VDA was in a specific Markov state.

If the state has changed, then the state may change in two unique ways. Thus, the decision in step 206 determines in which way the state has changed.

If the state has moved backwards, then the probability of moving back states may be calculated by ratio $$\frac{c}{n}$$

in step 207. In $$\frac{c}{n},$$

c is me number of times me state has moved backwards and n is the total number of times the VDA was in a specific Markov state.

If the state has moved forwards, then the probability of moving forward states may be calculated by the ratio $$\frac{b}{n}$$

in step 208. In $$\frac{b}{n},$$

b is the number of times the state has moved forward and n is the total number of times the VDA was in a specific Markov state.

The denominator of the ratios $$\frac{a}{n}, \frac{b}{n}, \text{and } \frac{c}{n}$$

indicates that the Markov chain may be more accurate the more data that the processor processes data regarding the VDA attempting to launch a session. The denominator n is based on the total number of times the VDA is in a specific state. Thus, n may be more accurate the more times the Markov chain had the opportunity to be in a certain state. The accuracy of the output of a non-deterministic system may depend on the system's behavior over time. Thus, as more time passes, the accuracy of the output may improve.

To improve the accuracy of the Markov chain ratios, historic information may be input into the system. In one embodiment, the system may process three months of data relating to the VDA successfully launching a session. In alternate embodiments, one year of data may be processed relating to the VDA successfully launching a session. In some embodiments, a user may specify how much data the system may process.

After the ratios and state transition probabilities are updated, in steps 207-209, the probability of a successful launch may be determined per VDA in step 210 using Equation 1 below.

$$P(\text{successful session launch}) = \beta\mu + \partial\frac{a}{n} \qquad \text{Equation 1}$$

In Equation 1, μ may be defined as the ratio of successful session launches to the total number of launched sessions from the current state. In other words, the probability of that VDA successfully launching a session from the current state may be evaluated.

The parameter μ depends on the system receiving information about whether the launch was actually successful. Thus, the number of successfully launched sessions may be recorded. In some embodiments, the management service may receive an identification of a particular VDA successfully launching a session. Upon successfully launching a session, the management service may increment a counter associated with the successful sessions launched from that particular VDA.

Further, the parameter μ depends on the total number of sessions from the current VDA state. In other words, μ depends on the number of times the VDA attempted to launch a session In some embodiments, the management service may maintain a counter associated with each VDA and record the number of access attempts associated with the particular VDA.

As described above, historic data may be used to improve the accuracy of the system. Thus, historic data may be used to refine since μ may be determined based on the total number of sessions from the current VDA state. Thus, the more historic information used to calculate the more accurate the probability of successfully launching from a given state may be.

The parameter μ may be refined by updating μ to reflect the successful accesses to access attempts associated with a particular VDA such that the accuracy of the probability of successfully launching a session from that particular VDA may improve.

In Equation 1, β and ∂ may be hyper parameters. For example, the parameters β and can indicate how much weight is given to the historical data and state transition probabilities respectively. Customers may have different environments, so the probability of a successful session launch may be tuned per a customer's unique environment. For example, given the scenario where historic successful session launches are high but there are rapid state changes, the weight associated with the historic session launches may be more helpful in determining a successful session launch than the rapid state transitions. Thus, β can be used to strengthen the effect of the historic session launches and ∂ can be used to soften the effect of the rapid session launches. Optimizing hyper parameters β and ∂ may be performed in accordance with any method. β and ∂ have the property that β+∂=1.

The decision in step 211 is based on the probability of successfully launching a session given the VDA's current state. A threshold may be determined, and the probability of successfully launching a session given the VDA's current state may be compared with the threshold. In some embodiments, a user may set the threshold value. In alternate embodiments, the management service may set the threshold value.

In step 213, the probability of successfully launching a session given the VDA's current state may be lower than the threshold value. In some embodiments, the management service may determine that the probability of successfully launching a session is below the threshold. The management service may make this determination based on comparing the probability of the VDA successfully launching a session from the current state to the threshold value.

For example, if the threshold is set to 40%, and the probability of the VDA successfully launching a session from the current state is 35%, the management service may determine that the probability of the VDA successfully launching a session from the current state is less than the threshold value.

In some embodiments, the management service may raise an alert indicating that the probability of the VDA successfully launching a session is less than the threshold value. This flag may indicate a high risk in using that particular VDA to launch a session. An administrator may be notified of this alert and choose to mitigate the risk of failing to launch a session given the VDA's state by assigning the client a different VDA. In some embodiments, an administrator may be notified of this alert and choose to mitigate the risk of failing to launch a session given the VDA's state by rebooting the flagged VDA.

In step 212, the probability of successfully launching a session given the VDA's current state may be higher than the threshold value. In these circumstances, the VDA may be deemed acceptable to be used by a client to launch a session. In some embodiments, the management service may determine that a client is in need of a VDA because the client may request access to a VDA.

For example, if the threshold is set to 40%, and then probability of the VDA successfully launching a session from the current state is 80%, an administrator may choose to keep the VDA assigned to that client. In alternate embodiments, the management service may select a VDA with the highest probability of successfully launching a session to assign to a client.

In alternate embodiments, an administrator at the management service may view each VDA's probability of a successful launch in a dashboard.

Each of the above mentioned steps may be implemented in hardware, or a combination of hardware and software, in one or more embodiments. Each component of the system may be implemented using hardware or a combination of hardware or software detailed below in connection with FIG. 7. For instance, each of these elements or entities can include any application, program, library, script, task, service, process, or any time and form of executable instructions executing on hardware of a client device. The hardware includes circuitry such as one or more processors in one or more embodiments.

Figure 3:
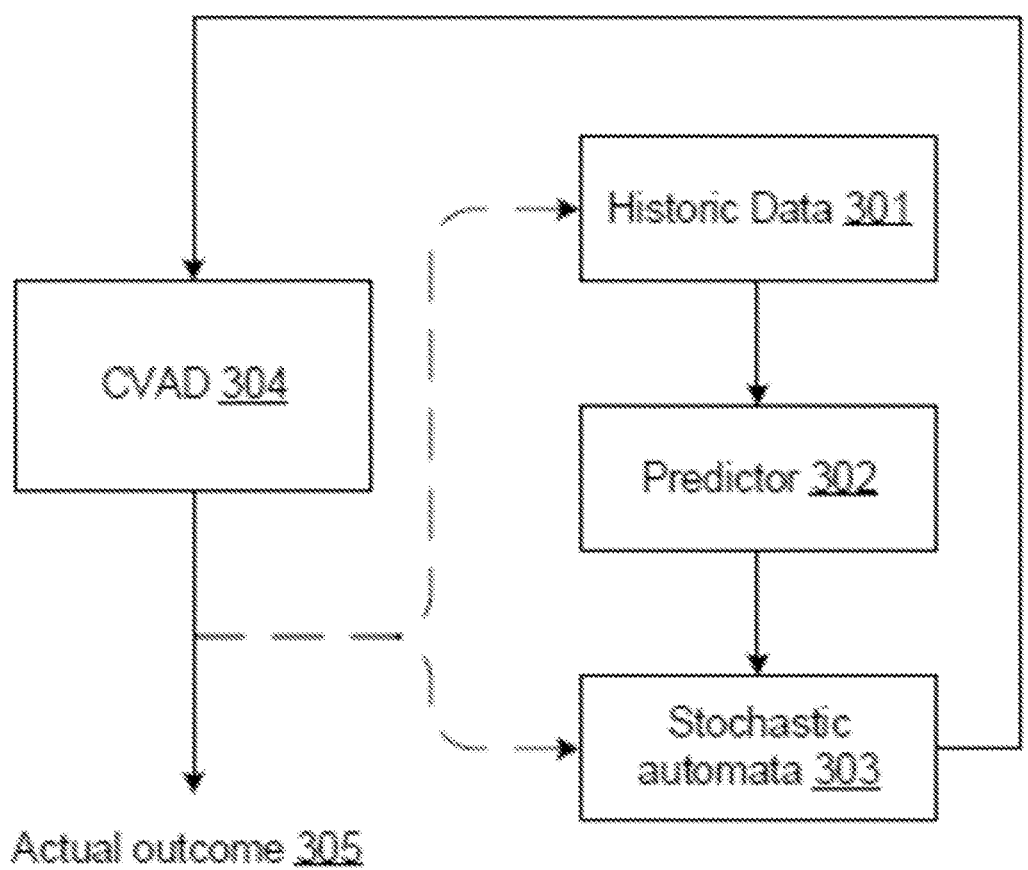
FIG. 3 is a block diagram of an embodiment of high-level computing a success probability of a session launch using stochastic automata.

Referring to FIG. 3, depicted is a block diagram of one embodiment of a high level system 300 computing a success probability of a session launch using stochastic automata.

Historic data 301 may be provided to the predictor 302 as an input. Historic VDA metrics may be input into the system as historic data 301 to improve the accuracy of the ratios that determine the state transition probabilities in the Markov chain. The denominator of the ratios $$\frac{a}{n}, \frac{b}{n}, \text{and } \frac{c}{n}$$

indicates that the Markov chain may be more accurate the more data that the processor processes data regarding the VDA attempting to launch a session. The denominator n is based on the total number of times the VDA is in a specific state. Thus, n may be more accurate the more times the Markov chain had the opportunity to be in a certain state.

The state transition probabilities in the Markov chain are based on the mapping performed by the predictor 302. The predictor 302 transforms the VDA metrics into probabilities of the metric occurring over time, for example, by using the PMF. In some embodiments, a PMF function may be used to find the correlation between the inputs to the probability of a successful session launch at a given time. The predictor 302 may create a data flow of time series data. In other words, the predictor may output a PMF distribution that shows the probability of the metrics occurring at a given time t.

The probabilities may then be mapped by the predictor 302 into states in a stochastic automata 303 based on the defined ranges of the states. The stochastic automata 303 is a means of expressing a state machine and the probabilities of staying in the same state and leaving the current state. A Markov chain is one type of stochastic automata where the future state in the state machine depends on the current state. In some embodiments, an eight state Markov chain may be used. The state transition probabilities $$\frac{a}{n}, \frac{b}{n}, \text{ and } \frac{c}{n}$$

may be updated based on the Markov state transitions and the predictor 302 mapping of the PMF output.

Improving the accuracy of the state transition probabilities in the Markov chain may improve the accuracy of the predicted probability of a VDA successfully launching a session given the VDA's current state.

The success of Citrix's Virtual Application and Desktop Services (CVAD) 304, may be modeled via the success of all of the VDA's within the CVAD. In other words, the probability of successfully launching sessions through a plurality of VDAs may indicate the success of the CVAD as a virtual environment.

Equation 1 above indicates that the probability of successfully launching a session for each VDA is based on the state transition probabilities in the Markov chain. The probability of success of each VDA may be averaged to determine the probability of success of the CVAD.

The probability of each VDA successfully launching a session may be communicated to an administrator at the management service. In one embodiment, the probability of the VDA successfully launching a session may be compared to a threshold value. If the probability of the VDA successfully launching a session is less than the threshold, the administrator may be alerted to that VDA's probability of successfully launching a session. If the probability of the VDA successfully launching a session is above the threshold, that VDA may be selected, by the administrator, for use by a client. In other embodiments, the probabilities of each VDA successfully launching a session may be communicated to an administrator at the management service by displaying the probabilities of each VDA successfully launching a session in a dashboard.

The actual outcome 305 represents the outcome of the user attempting to establish a connection with the CVAD 304. The actual outcome may be that the VDA successfully launched a session, or that the VDA did not successfully launch a session. In some embodiments, the actual outcome 305 may be input back into the system to adjust, for example, the μ in Equation 1. In other embodiments, the actual outcome 305 may be fed into the historic data 301. For example, if a user requests that the system process three months of data to improve the state transition probabilities in the Markov chain, the metrics of the VDA in those three months, as well as the actual outcome 305, may be input into the system.

Each of the above mentioned elements or entities is implemented in hardware, or a combination of hardware and software, in one or more embodiments. Each component of the system 300 may be implemented using hardware or a combination of hardware or software detailed below in connection with FIG. 7. For instance, each of these elements or entities can include any application, program, library, script, task, service, process, or any time and form of executable instructions executing on hardware of a client device. The hardware includes circuitry such as one or more processors in one or more embodiments.

Figure 4:
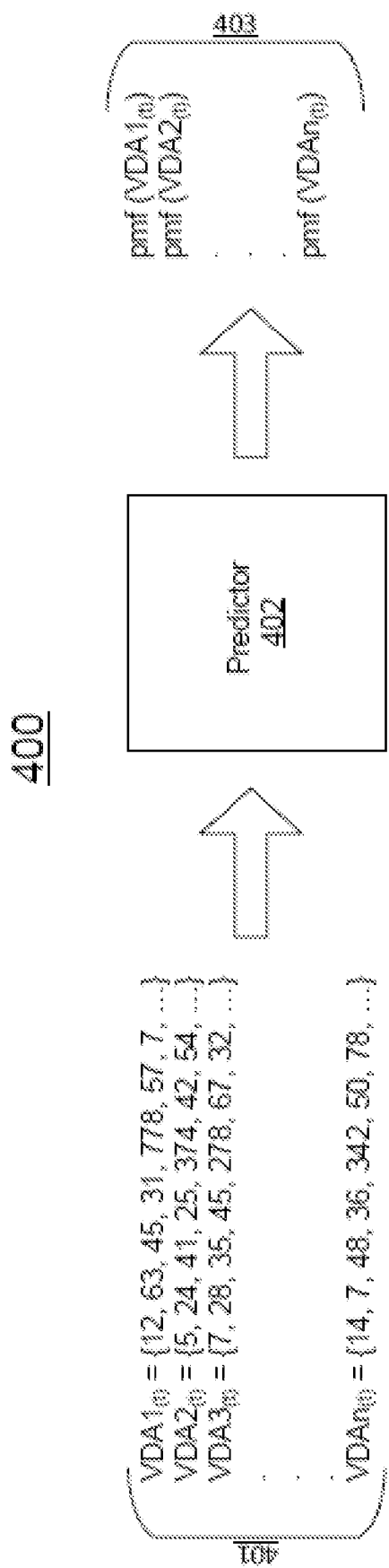
FIG. 4 is a block diagram of an embodiment of a predictor system used in computing the success probability of a session launch using stochastic automata.

Referring to FIG. 4, depicted is a block diagram of an embodiment of a predictor system 400 used in computing the success probability of a session launch using stochastic automata.

Area 401 represents the VDAs and the VDA's corresponding measurement metrics. The metrics may be used to model the VDA. Increasing the number of metrics may improve the accuracy of the probability of that VDA's successful launch. Computing the probability of a VDA's successful launch may be considered a non-deterministic system. In non-deterministic systems, the output of the system is unknown. The output of the system is determined by analyzing data points and determining a correlation between the data points and system behavior at points in time. Thus, the more data points used to determine the system behavior, the more accurate the output may be. Therefore, the more VDA metrics received by the processor, the more accurate the probability of that VDA's successful launch may be. Each VDA may be associated with a user authorized to access the CVAD. When a VDA launches a session, the VDA is attempting to access the CVAD such that a user may access the virtual desktop and applications.

Examples of VDA metrics may include: a session count, or the total number of sessions the VDA has attempted to connect; a VDA load, or the demand that the user is attempting to use the VDA for; User Experience Score, which is a measurement based on latency, round trip time, loss rates, time to launch the app, and responsiveness; ICA Round Trip Time, or the elapsed time from when a user hits a key until a response is display back at and end point for an ICA remote desktop session, etc. The VDA metrics may be arranged as an n dimensional vector.

In one embodiment, a predictor 402 is used to determine the correlation between the measurement metrics at certain times. In some embodiments, predictor 402 may be a PMF. The PMF outputs the probability that a discrete random variable is equal to some value. In other words, at time tin the system, the probability of the discrete random variable occurring may be determined. The VDA metrics may be considered discrete random variables, where each of the discrete random variables provides information about the output. A discrete random variable is a variable whose value may be determined by an underlying event. In other words, the value of the VDA metric may be determined by the success of the VDA launching a session. For example, the User Experience Score may be a very low value if the VDA does not successfully launch a session. Thus, using the PMF function may highlight the effect of each of the VDA metrics at a certain time t in successfully launching a session. The PMF may be the means of determining the correlation between the VDA metrics at a point in time.

Area 403 represents the PMF distribution produced by the predictor 402. The PMF distribution describes the probability of each metric occurring at a certain time t. The values in the PMF distribution may be translated to positive integers by multiplying the values in the PMF distribution by a multiple of 10. The predictor may map the positive integers to states in the Markov chain.

Each of the above mentioned elements or entities is implemented in hardware, or a combination of hardware and software, in one or more embodiments. Each component of the system 400 may be implemented using hardware or a combination of hardware or software detailed below in connection with FIG. 7. For instance, each of these elements or entities can include any application, program, library, script, task, service, process, or any time and form of executable instructions executing on hardware of a client device. The hardware includes circuitry such as one or more processors in one or more embodiments.

Figure 5:
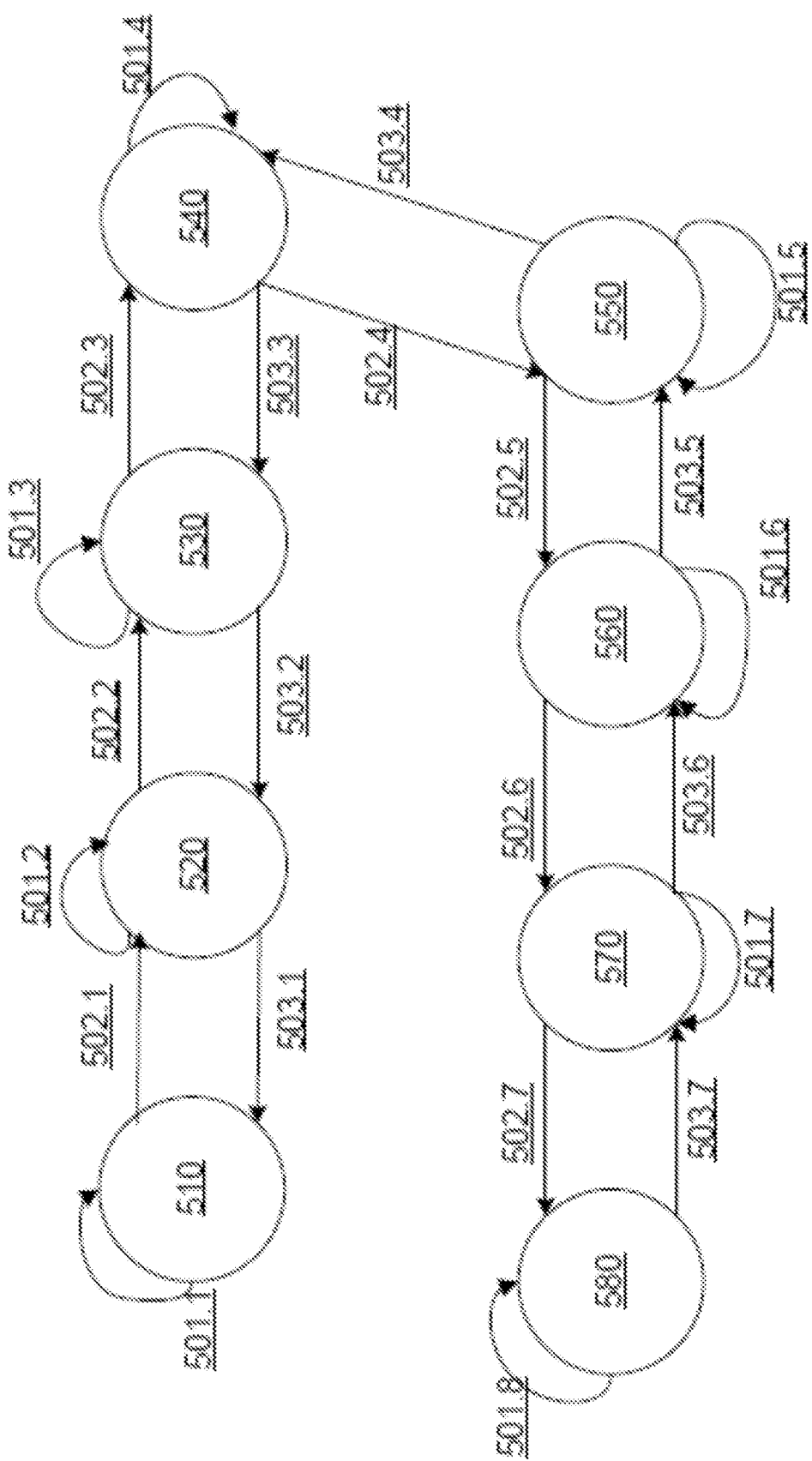
FIG. 5 is a block diagram of an embodiment of an eight state diagram.

Referring to FIG. 5, depicted is a block diagram of an embodiment of an eight state diagram. A stochastic automata is a state machine with a stochastic transition behavior. In other words, a stochastic automata may indicate a set of states that may exist and the probability of being in that state and the probability of moving between states. A Markov chain is one embodiment of stochastic automata. A Markov chain may contain any number of states. The more states in the Markov chain, the more granular the determination of the transition probabilities may be. In some embodiments, an eight state Markov chain may be implemented. The eight states in the Markov chain are 510, 520, 530, 540, 550, 560, 570, and 580.

Probability 501 represents the probability of staying in the same state and may be calculated by evaluating the ratio $$\frac{a}{n},$$

where a is the number of times me state has been mapped to the current state without any transition, and n is the total number of times the VDA was in a specific Markov state.

Probability 502 represents the probability of transitioning to the next state and may be calculated by $$\frac{b}{n},$$

where b is the number of times the state has moved forward and n is the total number of times the VDA was in a specific Markov state.

Probability 503 represents the probability of transitioning to the previous state and may be calculated by $$\frac{c}{n},$$

where c is me number of times me state has moved backwards and n is the total number of times the VDA was in a specific Markov state.

Each state may have a unique probability of transitioning with respect to that state. For example, state 510 has a probability of 501.1 of staying in state 501, while state 520 has a probability of 501.2 of staying in state 502. In some embodiments, probability 501.1 may be the same as probability 501.2. In other embodiments, probability 501.1 may be different from probability 501.2. The probabilities 501, 502 and 503 are updated iteratively, based on the VDA attempts to launch a session. The probabilities from the Markov chain are used in determining the probability of the VDA successfully launching a session.

Figure 6:
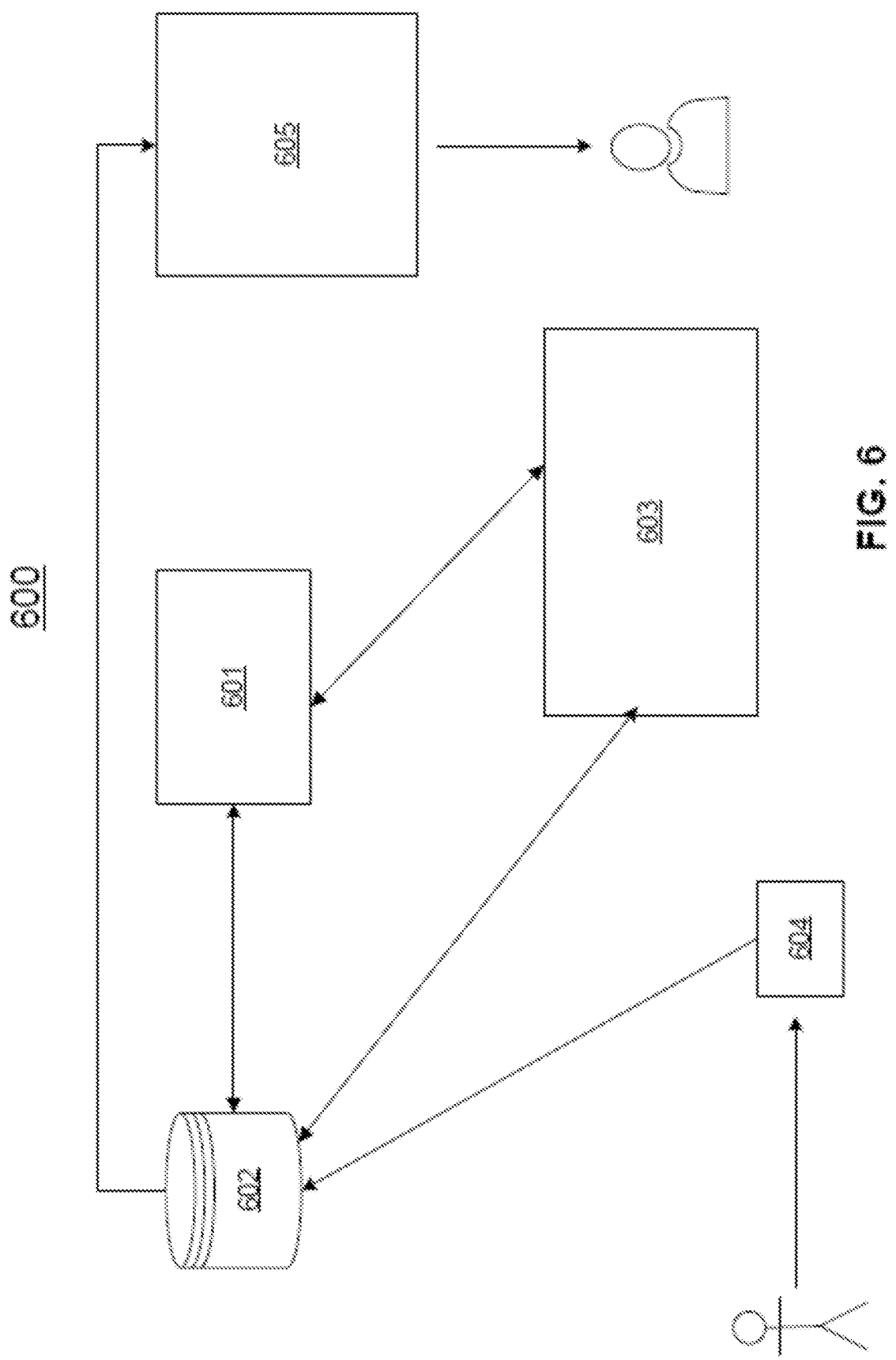
FIG. 6 is a block diagram of an embodiment of computing a success probability of a session launch using stochastic automata.

Referring to FIG. 6, depicted is a block diagram of system 600 computing a success probability of a session launch using stochastic automata.

In 601, an input vector of historic values of time series data 602 is used to create an initial Markov chain. As discussed above, the probabilities of the state transitions in the Markov chain, calculated by ratios $$\frac{a}{n}, \frac{b}{n}, \text{ and } \frac{c}{n}$$

may improve over time. The denominator of the ratios $$\frac{a}{n}, \frac{b}{n}, \text{ and } \frac{c}{n}$$

indicates that the Markov chain may be more accurate the more time that passes. The denominator n is based on the total number of times the VDA is in a specific state. Thus, n may be more accurate the more times the Markov chain has the opportunity to be in a certain state. The accuracy of the output of a non-deterministic system may depend on the system's behavior over time. Thus, as more time passes, the accuracy of the output may improve. The more historic data that is input, the more accurate the probability of successfully launching a session may be.

The time series data 602 is data that was collected at a certain time. For example, VDA metrics of a session launch at time t may be stored. Further, VDA metrics of a session launch the next time a user attempts to connect to the CVAD, for example at time t+1, may be stored. This data is time series data because it changes over time.

At 603, a predictor is used to determine the correlation between the measurement metrics at certain times. As discussed herein, the VDA measurement metrics can be considered discrete random variables because the VDA metrics can be determined by an underlying event. In other words, the value of the VDA metric may be determined by the success of the VDA launching a session. For example, the User Experience Score may be a very low value if the VDA does not successfully launch a session. In some embodiments, a PMF may be used to highlight the effect of the VDA metrics at a certain time tin successfully launching a session. As discussed herein, in response to an input of a discrete random variable vector, the PMF behaves as a joint PMF and output an integer value representing the correlation between the discrete random variable VDA metrics for each VDA.

The distribution of the PMF may be translated to whole integers by multiplying the distribution by multiples of 10. The predictor 603 may then map the integers to states in the Markov chain in 601. The state of the Markov chain 601 may transition based on the predictor 603 mapping the PMF distribution. The transition probabilities $$\frac{a}{n}, \frac{b}{n}, \text{ and } \frac{c}{n}$$

may be updated based on the Markov state transitions. The transitions probabilities $$\frac{a}{n}, \frac{b}{n}, \text{ and } \frac{c}{n}$$

may be stored as time series data in 602.

In 604, a user may launch a session and attempt to connect to the CVAD. The connection to the CVAD may be based on the VDA. The connection with the CVAD will either be successful or fail. Thus, session events at time t will be created that indicate whether or not the user's connection with the CVAD was successful, and subsequently whether the VDA successfully launched the session. The session events at time t become part of the collection of time series data at 602. For example, at time t, data may be collected of a VDA successfully launching a session, while at time t+1 data may be collected of a VDA's failed session launch.

The user's time series data from 602 may then be used by the PMF at 603. The PMF may be the means of determining the correlation between the VDA metrics at a point in time. The distribution of the PMF may be translated to whole integers by multiplying the distribution by multiples of 10. The distribution may subsequently be mapped by a predictor to states in a Markov chain 601. The state of the Markov chain 601 may transition based on the predictor 603 mapping the PMF distribution. The transition probabilities $$\frac{a}{n}, \frac{b}{n}, \text{ and } \frac{c}{n}$$

may be updated based on the Markov state transitions.

The transition probabilities $$\frac{a}{n}, \frac{b}{n}, \text{ and } \frac{c}{n}$$

may be used to determine the probability of a given VDA successfully launching a session according to Equation 1 above. The probability of a successfully launch may become time series data 602.

At 605, an administrator at a management-service may view the probabilities of successfully launching a VDA in a dashboard and determine whether or not to assign a particular VDA to a user. In other embodiments, the probabilities of successfully launching VDAs may be compared with a threshold probability and an alert may be set for a particular VDA if the probability of successfully launching that VDA is less than the threshold.

Each of the above mentioned elements or entities is implemented in hardware, or a combination of hardware and software, in one or more embodiments. Each component of the system 600 may be implemented using hardware or a combination of hardware or software detailed below in connection with FIG. 7. For instance, each of these elements or entities can include any application, program, library, script, task, service, process, or any time and form of executable instructions executing on hardware of a client device. The hardware includes circuitry such as one or more processors in one or more embodiments.

C. Computing Environment

It may be helpful to discuss the computing environments in which the systems and methods of computing a success probability of a session launch may be deployed.

As shown in FIG. 1, computer 701 may include one or more processors 703, volatile memory 722 (e.g., random access memory (RAM)), non-volatile memory 728 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 723, one or more communications interfaces 718, and communication bus 750. User interface 723 may include graphical user interface (GUI) 724 (e.g., a touchscreen, a display, etc.) and one or more input/output (I/O) devices 726 (e.g., a mouse, a keyboard, a microphone, one or more speakers, one or more cameras, one or more biometric scanners, one or more environmental sensors, one or more accelerometers, etc.). Non-volatile memory 728 stores operating system 715, one or more applications 716, and data 717 such that, for example, computer instructions of operating system 715 and/or applications 716 are executed by processor(s) 703 out of volatile memory 722. In some embodiments, volatile memory 722 may include one or more types of RAM and/or a cache memory that may offer a faster response time than a main memory. Data may be entered using an input device of GUI 724 or received from I/O device(s) 726. Various elements of computer 701 may communicate via one or more communication buses, shown as communication bus 750.

Figure 7:
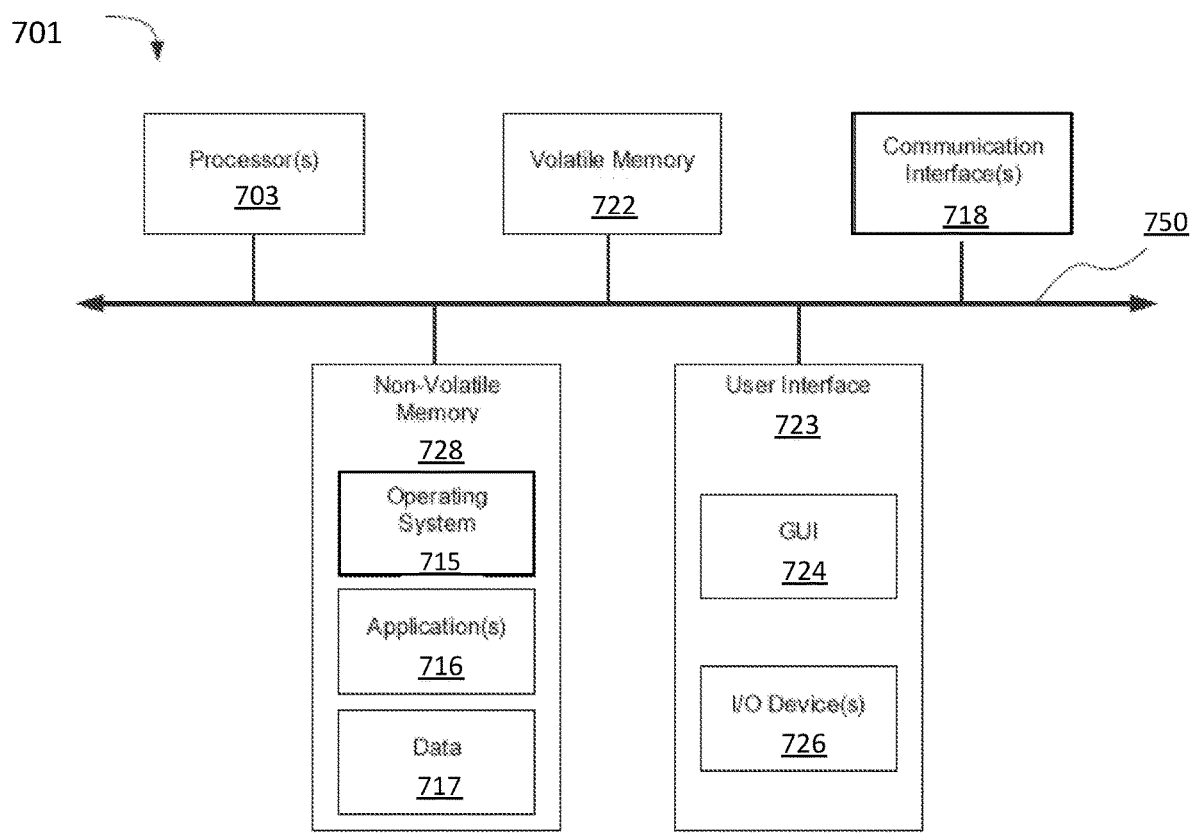
FIG. 7 is a block diagram of embodiments of a computing device.

Computer 701 as shown in FIG. 7 is shown merely as an example, as clients, servers, intermediary and other networking devices and may be implemented by any computing or processing environment and with any type of machine or set of machines that may have suitable hardware and/or software capable of operating as described herein. Processor (s) 703 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 718 may include one or more interfaces to enable computer 701 to access a computer network such as a Local Area Network (LAN), a Wide Area Network (WAN), a Personal Area Network (PAN), or the Internet through a variety of wired and/or wireless or cellular connections.

In described embodiments, the computing device 701 may execute an application on behalf of a user of a client computing device. For example, the computing device 701 may execute a virtual machine, which provides an execution session within which applications execute on behalf of a user or a client computing device, such as a hosted desktop session. The computing device 701 may also execute a terminal services session to provide a hosted desktop environment. The computing device 701 may provide access to a computing environment including one or more of: one or more applications, one or more desktop applications, and one or more desktop sessions in which one or more applications may execute.

Additional details of the implementation and operation of network environment, computer 701 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method, comprising:
for each virtual delivery agent of a plurality of virtual delivery agents executed by one or more computing devices:
receiving, by a management service executed by a processor, a plurality of metric measurements for the virtual delivery agent,
determining, by the management service from the plurality of metric measurements, a current state of a plurality of states of the virtual delivery agent, each state of the plurality of states associated with a ratio of successful accesses of the virtual delivery agent to access attempts of the virtual delivery agent, and
calculating, by the management service, a probability of successful access of the virtual delivery agent according to the ratio associated with the current state of the virtual delivery agent;
receiving, by the management service, a request of a client device to access a virtual application and desktop;
selecting, by the management service, a virtual delivery agent of the plurality of virtual delivery agents associated with a highest probability of successful access;
directing, by the management service, the request of the client device to the selected virtual delivery agent;
determining, by the management service, that a probability of successful access to a second virtual delivery agent is below a threshold;
generating, by the management service, an alert responsive to the determination that the probability of successful access to the second virtual delivery agent is below the threshold; and
initiating a reboot of the second virtual delivery agent, by the management service, responsive to the determination that the probability of successful access to the second virtual delivery agent is below the threshold.

2. The method of claim 1, further comprising incrementing, by the management service, an access attempt counter associated with the selected virtual delivery agent.

3. The method of claim 1, further comprising:
receiving, by the management service from the selected virtual delivery agent or the client device, an identification of successful access of the selected virtual delivery agent; and
responsive to receipt of the identification, incrementing a counter of successful accesses of the selected virtual delivery agent.

4. The method of claim 3, further comprising updating the ratio of successful accesses to access attempts associated with the selected virtual delivery agent.

5. The method of claim 1, wherein the plurality of states comprise a linear Markov chain.

6. The method of claim 1, wherein the plurality of metric measurements comprise a multi-dimensional measurement vector.

7. The method of claim 1, wherein the plurality of metric measurements comprise a round trip time of communications between the client device and the virtual delivery agent.

8. A system, comprising:
a management service executed by a processor in communication with a plurality of virtual delivery agents executed by one or more computing devices;
wherein the management service is configured to:
for each virtual delivery agent of the plurality of virtual delivery agents:
receive a plurality of metric measurements for the virtual delivery agent,
determine, from the plurality of metric measurements, a current state of a plurality of states of the virtual delivery agent, each state of the plurality of states associated with a ratio of successful accesses of the virtual delivery agent to access attempts of the virtual delivery agent, and
calculate a probability of successful access of the virtual delivery agent according to the ratio associated with the current state of the virtual delivery agent;
receive a request of a client device to access a virtual application and desktop;
select a virtual delivery agent of the plurality of virtual delivery agents associated with a highest probability of successful access;
direct the request of the client device to the selected virtual delivery agent
determine that a probability of successful access to a second virtual delivery agent is below a threshold;
generate an alert responsive to the determination that the probability of successful access to the second virtual delivery agent is below the threshold; and
initiate a reboot of the second virtual delivery agent, by the management service, responsive to the determination that the probability of successful access to the second virtual delivery agent is below the threshold.

9. The system of claim 8, wherein the management service is further configured to increment an access attempt counter associated with the selected virtual delivery agent.

10. The system of claim 8, wherein the management service is further configured to:
receive, from the selected virtual delivery agent or the client device, an identification of successful access of the selected virtual delivery agent; and
responsive to receipt of the identification, increment a counter of successful accesses of the selected virtual delivery agent.

11. The system of claim 10, wherein the management service is further configured to update the ratio of successful accesses to access attempts associated with the selected virtual delivery agent.

12. The system of claim 8, wherein the plurality of states comprise a linear Markov chain.

13. The system of claim 8, wherein the plurality of metric measurements comprise a multi-dimensional measurement vector.

14. The system of claim 8, wherein the plurality of metric measurements comprise a round trip time of communications between the client device and the virtual delivery agent.

15. A non-transitory computer-readable medium comprising instructions that, when executed by a processor of a device, cause the processor to:
    for each virtual delivery agent of a plurality of virtual delivery agents executed by one or more computing devices:
        receive a plurality of metric measurements for the virtual delivery agent,
        determine, from the plurality of metric measurements, a current state of a plurality of states of the virtual delivery agent, each state of the plurality of states associated with a ratio of successful accesses of the virtual delivery agent to access attempts of the virtual delivery agent, and
        calculate a probability of successful access of the virtual delivery agent according to the ratio associated with the current state of the virtual delivery agent;
    receive a request of a client device to access a virtual application and desktop;
    select a virtual delivery agent of the plurality of virtual delivery agents associated with a highest probability of successful access;
    direct the request of the client device to the selected virtual delivery agent;
    determine that a probability of successful access to a second virtual delivery agent is below a threshold;
    generate an alert responsive to the determination that the probability of successful access to the second virtual delivery agent is below the threshold; and
    initiate a reboot of the second virtual delivery agent responsive to the determination that the probability of successful access to the second virtual delivery agent is below the threshold.

\* \* \* \* \*